T. CARROLL.
CASH REGISTER AND RECORDER.
APPLICATION FILED SEPT. 20, 1901. RENEWED FEB. 6, 1907.
980,201.
Patented Jan. 3, 1911.
7 SHEETS—SHEET 3.
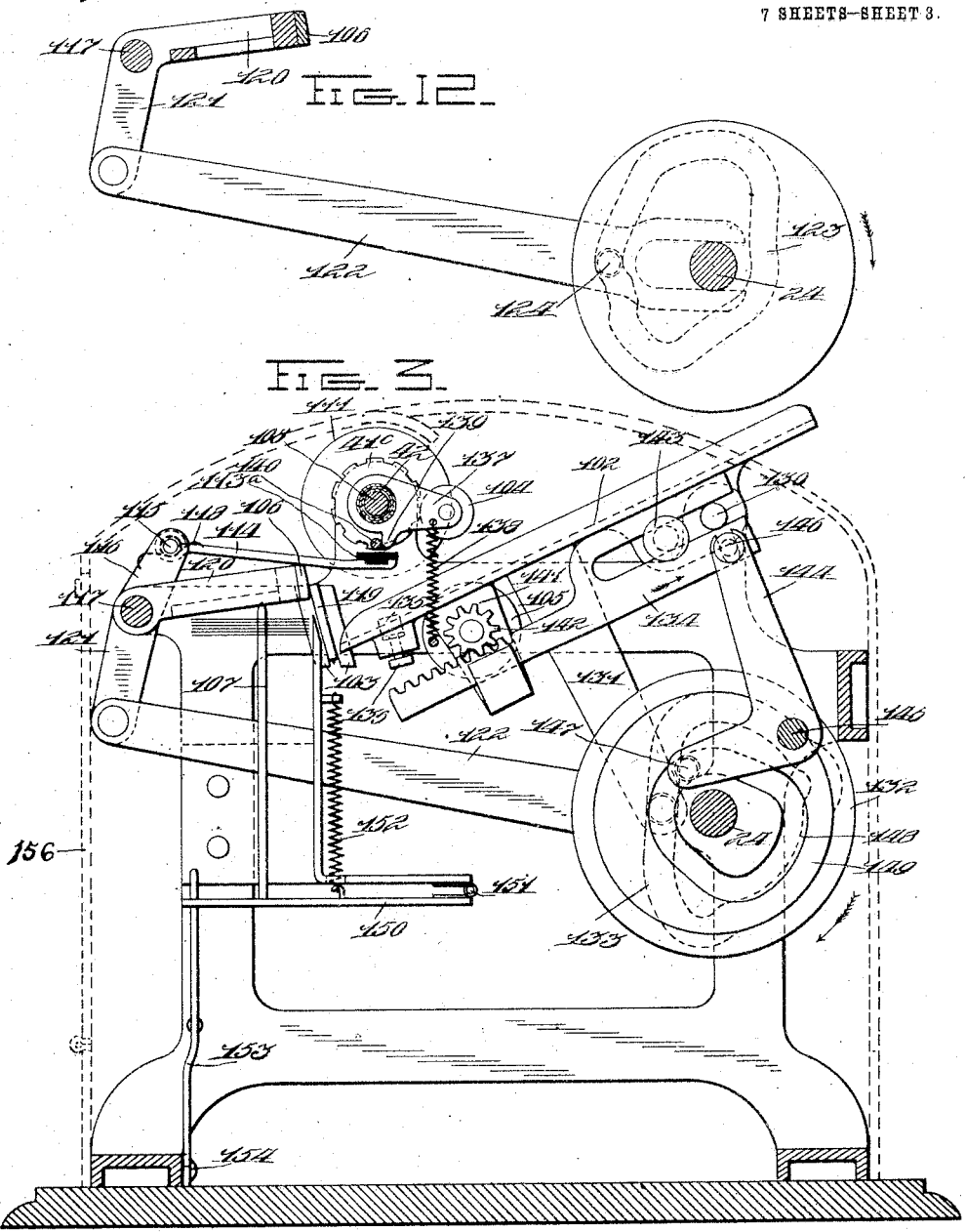
Witnesses
W. McCarthy
Inventor
Thomas Carroll
By Alvan Macauley
Attorney T. CARROLL.
CASH REGISTER AND RECORDER.
APPLICATION FILED SEPT. 20, 1901. RENEWED FEB. 6, 1907.
980,201.
Patented Jan. 3, 1911.
7 SHEETS—SHEET 4.
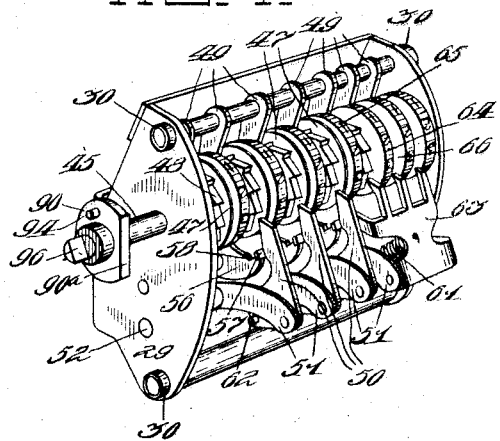
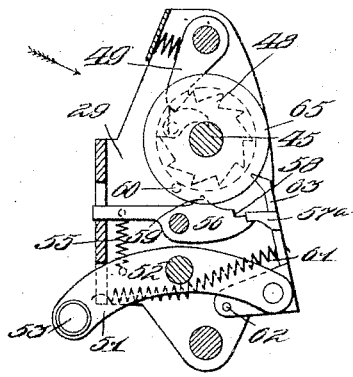
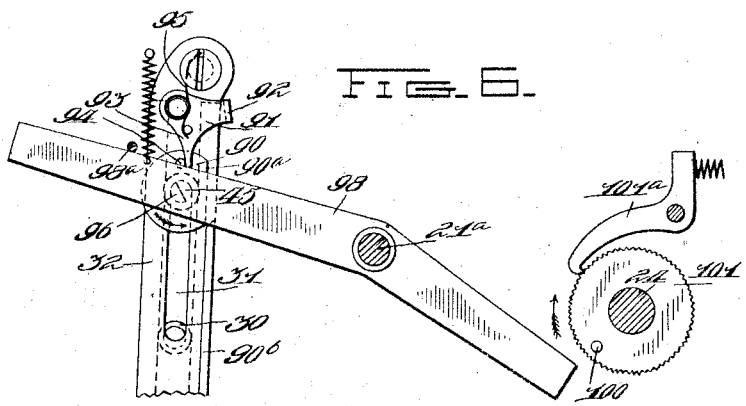
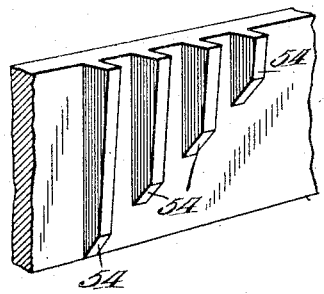
Witnesses
W. McCarthy
Inventor
Thomas Carroll
By Sloan Macauley
Attorney T. CARROLL.
CASH REGISTER AND RECORDER.
APPLICATION FILED SEPT. 20, 1901. RENEWED FEB. 6, 1907.
980,201.
Patented Jan. 3, 1911.
7 SHEETS—SHEET 5.
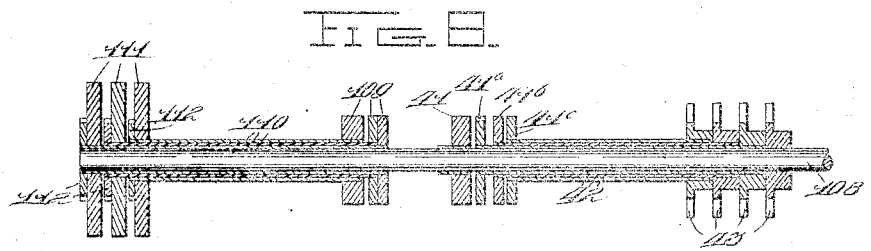
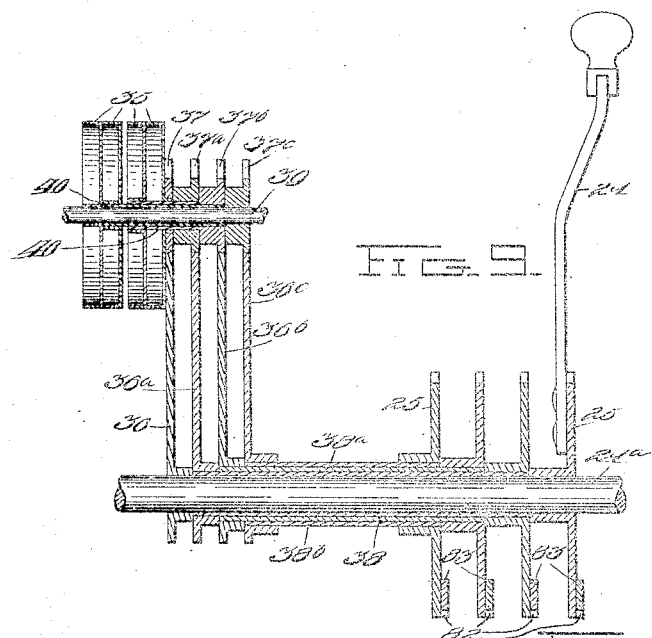
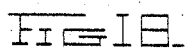 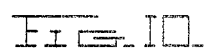 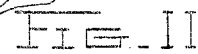
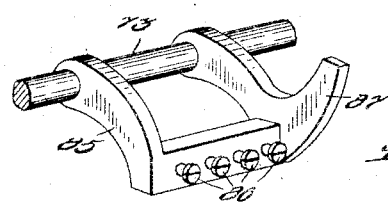 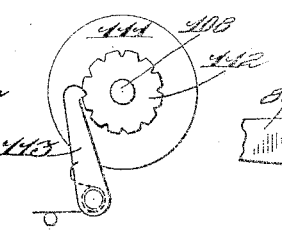 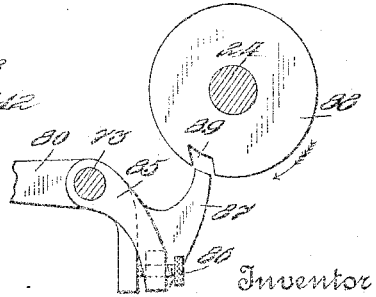
Witnesses
W. McCarthy
W. H. Muzzy
Inventor
Thomas Carroll
by Alvan Macauley
Attorney T. CARROLL.
CASH REGISTER AND RECORDER.
APPLICATION FILED SEPT. 20, 1901. RENEWED FEB. 6, 1907.

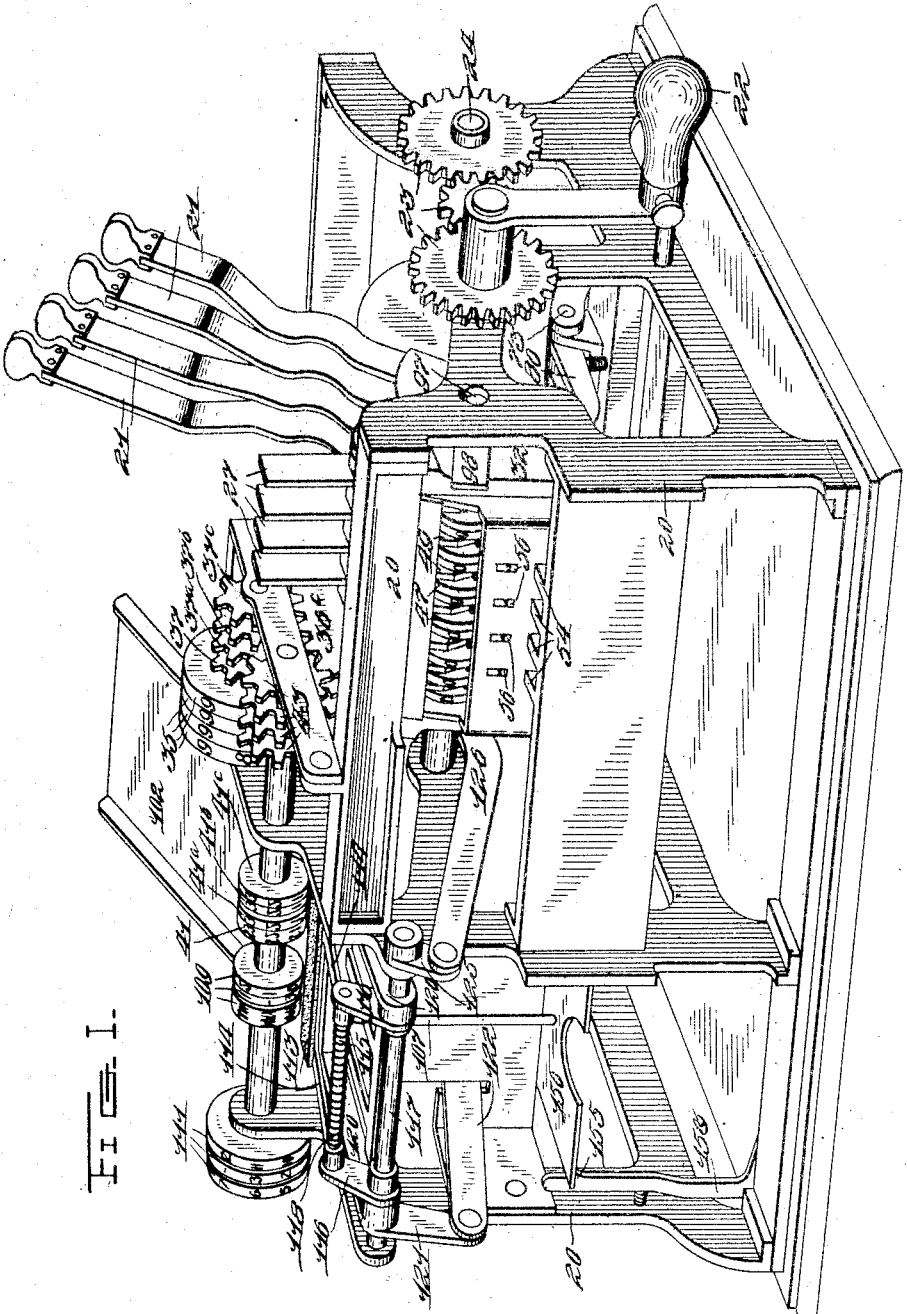

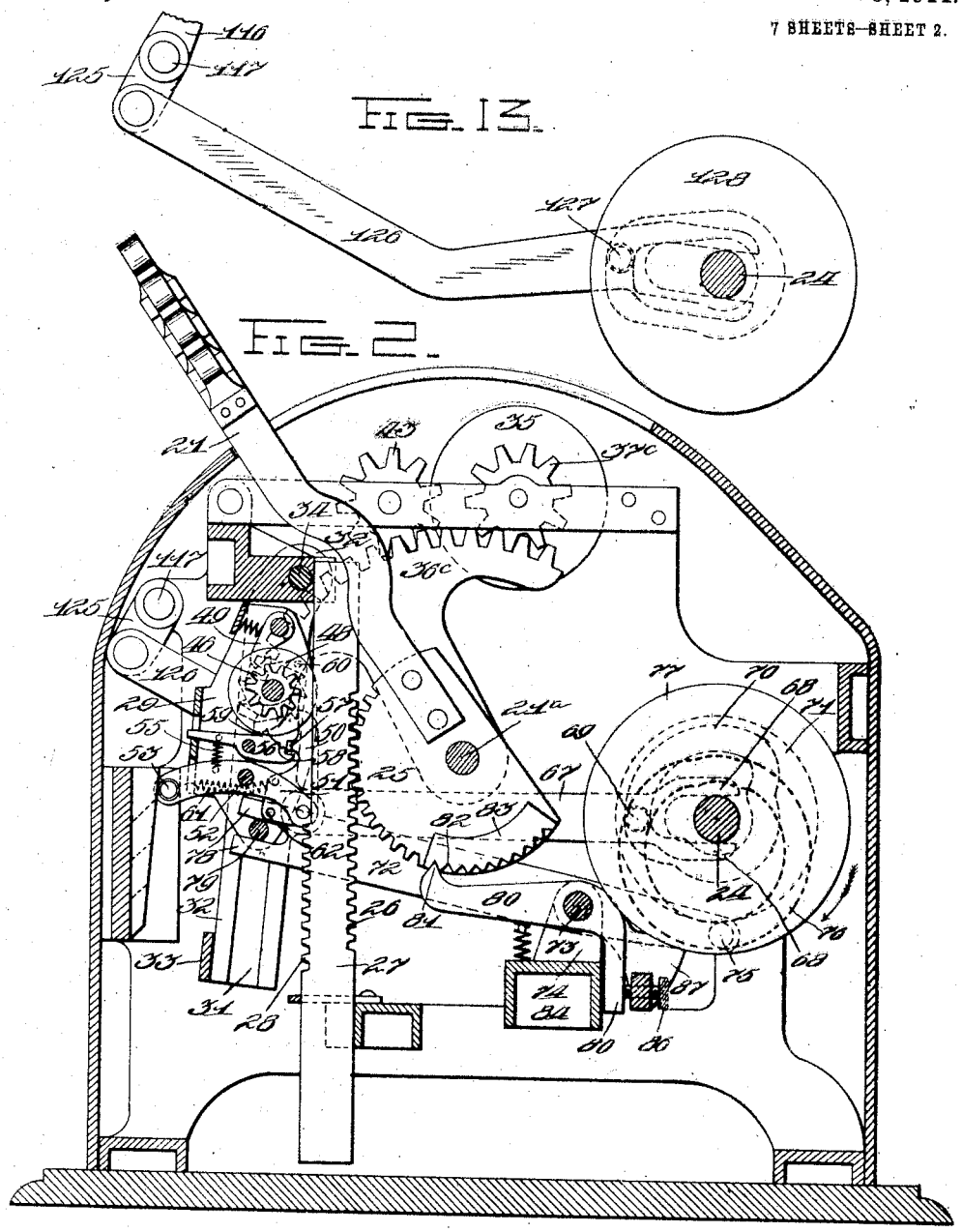

980,201.

Patented Jan. 3, 1911.

7 SHEETS—SHEET 6.

Witnesses
W. McCarthy
H. C. Thugg

Inventor
Thomas Carroll
By Alvan Macauley
Attorney

T. CARROLL.
CASH REGISTER AND RECORDER.
APPLICATION FILED SEPT. 20, 1901. RENEWED FEB. 6, 1907.

980,201.

Patented Jan. 3, 1911.
7 SHEETS—SHEET 7

Witnesses

Inventor
Thomas Carroll
By Alvan Macauley
Attorney

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH REGISTER AND RECORDER.

980,201.          Specification of Letters Patent.         Patented Jan. 3, 1911.

Application filed September 20, 1901, Serial No. 75,713. Renewed February 6, 1907. Serial No. 356,096.

*To all whom it may concern:*

Be it known that I, THOMAS CARROLL, a citizen of the United States, residing at Dayton, in the county of Montgomery and State of Ohio, have invented certain new and useful Improvements in Cash Registers and Recorders, of which I declare the following to be a full, clear, and exact description.

This invention relates to improvements in registering and recording machines and has more particular relation to machines for recording sales in connection with systems employing check slips and vouchers.

The object of the invention is to provide improved devices for printing upon the slips certain amounts and then cutting vouchers from the slips and retaining the same within the machine.

The invention consists in certain constructions, combinations and arrangements of parts all of which will be hereinafter more particularly set forth and claimed.

Figure 16:
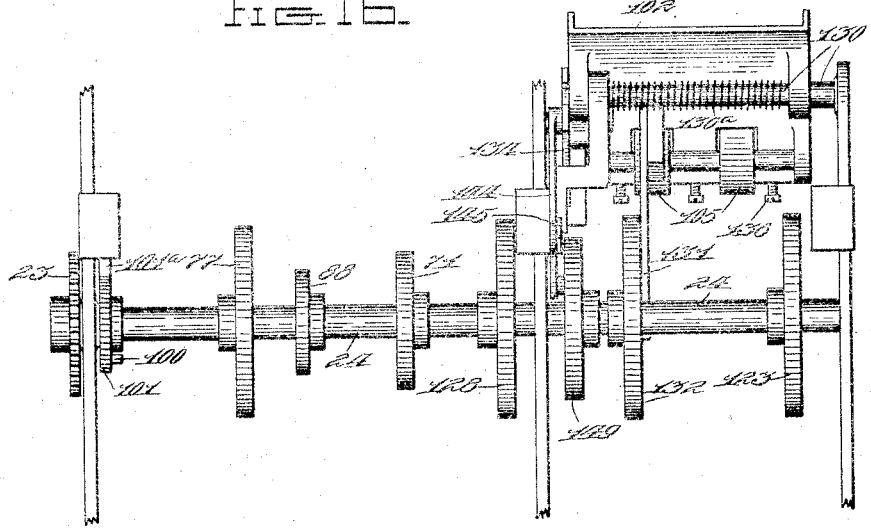
Figure 17:
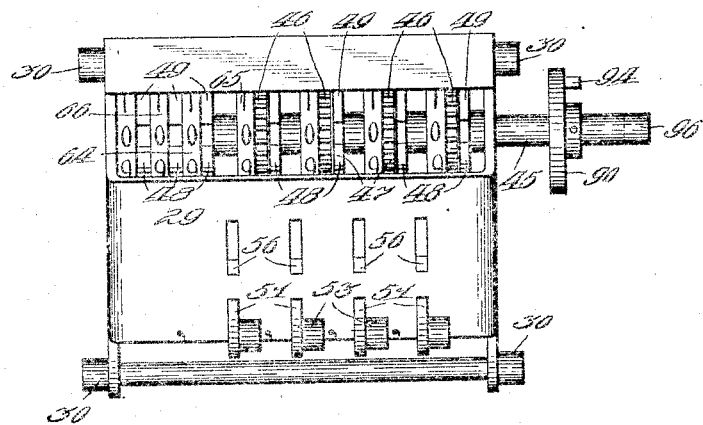

In the accompanying drawings forming part of this specification: Figure 1 represents a perspective view of the machine embodying my invention, the cabinet of the same being removed. Fig. 2 represents a vertical transverse section through the machine taken on a plane just within the right hand end of the machine and looking to the left; the cabinet being shown in position. Fig. 3 represents a vertical transverse section taken just to the right of the printing mechanism and showing the cabinet with its hinged door. Fig. 4 represents an enlarged detail perspective view of the counter. Fig. 5 represents a vertical section through the same. Fig. 6 represents a detail end elevation of one of the vertical side arms of the counter supporting frame and the turn to zero locking lever. Fig. 7 represents an enlarged detail perspective view of the stationary operating cams for the transfer mechanism. Fig. 8 represents a detail vertical section through the nested sleeves, printing wheels and actuating devices for said sleeves. Fig. 9 represents a detail vertical section showing the connection between the indicators and the operating levers. Fig. 10 represents a detail end elevation of one of the milled detents or disks for setting the dating wheels. Fig. 11 represents a detail end elevation of the lever locking devices. Fig. 12 represents a detail end elevation partly in section of the movable knife and its operating connections. Fig. 13 represents a detail end elevation of the pitman and operating connections for actuating the inking pad. Fig. 14 represents a detail top plan view of a portion of the cabinet showing the lever slots and the index numbers. Fig. 15 represents a plan view of one of the checks or slips used in connection with this machine with the voucher portion severed therefrom. Fig. 16 represents a detail rear elevation of the main operating shaft, the operating cams and the slip supporting table. Fig. 17 represents a detail front elevation of the counter and its frame; and Fig. 18 represents a detail perspective view of a portion of the locking frame shown in Fig. 11.

Described in general terms the machine includes a series of setting levers which position suitable racks, over which the counter is afterward passed. As this construction of the registering mechanism is described and claimed in my Patent No. 751,611 granted Feb. 9, 1904 I have not claimed the same here but have simply shown it as an illustration of one form of registering mechanism that may be used in connection with my improved recording mechanism. In this particular form of register the amount to be registered depends upon the position of the setting levers at the time the operating crank 22 is turned. If all the setting levers be opposite the "0" marks on the index, as shown in Fig. 2 nothing will be registered. If the units-of-cents setting lever be at the "5" mark on the index, 5¢ will be registered, etc. The power which is applied through the crank is transmitted through gears 23 to the rotation shaft 24, upon which are mounted various cams, and a full stroke device. All of the parts of the machine are driven from this motor shaft.

Fig. 2 shows the setting and registering mechanism of the machine. Each setting lever, of which there are four, is connected to a rack segment 25, of which there are also four; that is to say, one for each setting lever. The rack segments, and consequently their respective setting levers, are pivoted upon the transverse pivot-shaft $21^a$. The gear teeth of the segments are at all times in mesh with rack teeth 26 upon the rear edges of the four vertical registering rack-bars 27. Upon the front edges of the rack-bars are the registering-rack teeth 28. It will thus be readily understood that the registering rack-bars will be always in a position corresponding to the position of their respective setting-levers. The principal function of the setting levers is as a means for setting the several registering rack-bars.

In most total adding cash registers heretofore in use the registering-racks are brought into engagement with the register-wheels by the initial movement of the crank, and then afterward the registering-racks or segments are given a certain movement so as to turn the register-wheels. In the present instance, however, the registering-racks are not moved after they are adjusted to position by the setting levers; it is the counter that is moved, and it is given a certain definite travel at each operation of the machine, in such a plane that during its movement in one direction it will pass along in engagement with some or all of the registering-rack teeth, according to the positions of the respective setting-levers, and hence the register-wheels will be properly turned to register the amount desired.

During its return movement the counter is not in engagement and during this time the transfer is effected. To this end the counter complete is supported in and carried by a frame 29 which has two anti-friction rollers 30 upon each end. The counter-frame, with its counter, is vertically slidable in a rock-frame which is formed of the two parallel vertical side-arms 32 which are connected at their lower ends by a tie-bar 33. The inner side of each vertical side-arm bears, or has formed therein, a slide-way 31. The anti-friction rollers 30 of the counter-frame run in these slide-ways and in this manner the counter is vertically movable. The cross-shaft 34 passes through bearings formed in the upper ends of the vertical side-arms 32. On this cross-shaft, therefore, the rock-frame carrying the counter, may be swung a limited distance toward the rear and back again to normal position.

The machine is arranged when operated first, to swing the counter a short distance toward the rear in order to bring the teeth of the counter-pinions in line with the vertically extending registering rack-teeth. Then the counter is moved downward so as to pass over the registering rack-teeth and be turned thereby. Third, the counter is swung toward the front of the machine out of engagement with the registering rack-teeth; and finally the counter is moved upward to normal position.

For convenience in setting or adjusting the levers 21 to the desired positions, there are provided four small indicators 35. (Shown in Figs. 1, 2 and 9). Each indicator is connected to its setting lever through its registering segments 25. The units-of-cents segment is secured rigidly upon the pivot-shaft 21$^a$. In like manner the units-of-cents indicator-segment 36 is secured upon said shaft and is always in mesh with the indicator pinion 37 carried by the units-of-cents indicator 35. The tens-of-cents registering segment is secured upon the right-hand end of a sleeve 38, and upon the left-hand end thereof is secured the tens-of-cents indicator-segment 36$^a$. In like manner the units-of-dollars indicator segment 36$^b$ and the tens-of-dollars indicator segment 36$^c$ are rigidly connected with their respective registering segments through the sleeves 38$^a$ and 38$^b$. Through the sleeves 40 and the pinions 37$^a$, 37$^b$, and 37$^c$, which are all concentric and turn upon the indicator shaft 39, the indicators are geared to their respective indicator segments. Under this construction it results that when a setting lever is moved, its respective indicator simultaneously moves correspondingly.

As shown in the drawings there are four amount or value printing wheels 41, 41$^a$, 41$^b$, and 41$^c$, and these are connected in a well known manner through sleeves 42 and the pinions 43 with the respective indicator segments 36, 36$^a$, 36$^b$ and 36$^c$, (Figs. 2 and 8).

It results from the construction just described that the movement or adjustment of any setting lever directly moves, simultaneously and to a corresponding extent, the indicators 35, the registering rack-bars 27, and the value printing-wheels. The indicators, therefore, form a convenient means for setting the various parts just enumerated so as to register and record a desired amount, because the operator can simply adjust the setting levers until the indicators show the amount he desires to register and can then be certain that the subsequent turning of the crank 22 will cause that desired amount to be registered and recorded.

As shown in Fig. 17, each of the first four counter or registering wheels (from right to left) carries a registering pinion 46, which is arranged to engage with its respective one of the four registering racks 28. Each pinion is secured to the right-hand side of its respective registering wheel, and to the right-hand side of each pinion is secured a thin metal disk 47, of a diameter about equal to that of the registering wheel, and finally, to the right-hand side of each disk is secured the ratchet-wheel 48. The purpose of the disks 47 is to keep the registering-rack properly in engagement with the registering-segments.

Coöperating with the ratchet wheels 48 are the usual retaining pawls 49 to prevent retrograde movement of the registering-wheels. Also coöperating with the ratchet-wheels are the transfer pawls 50. These are respectively pivoted at their lower ends to the rear ends of the pawl-actuating levers 51, each of which is pivoted about midway of its length upon the small cross-shaft 52 which is supported at its ends in the counter-frame. At its front end, each of the pawl-actuating levers, of which there are four, carries an anti-friction roller 53. During the return movement of the counter; that is, while it is being swung upward to normal position, these anti-friction rollers contact with the fixed transfer-cams or projections 54, which are secured near the front of the casing of the machine and are arranged in graduated order, so that the respective pawl-actuating levers will contact with the transfer-cams successively and thereby be successively actuated, that is, the front ends are swung downward and their rear ends carrying the transfer pawls 50 are swung against the tension of the springs 55 which are interposed between the pawl-carrying levers and the trip-pawls 56. The latter are, as usual, for the purpose of holding the transfer-pawls in outward position so that normally they will not strike the ratchet-wheels 46, and hence normally will not move the registering-wheels, and this despite the fact that all of the pawl-carrying levers are successively actuated at each operation of the machine, and consequently each transfer-pawl is swung upward and then back at each operation of the machine. The trip-pawl holds the transfer-pawl in inoperative position by reason of the normal engagement of a shoulder 57 with the outer one of two notches 58 formed on the rear end of the trip-pawl. The upper edge of said pawl is provided with an operating nose 59 which lies in the path of a trip-pin or projection 60, from which it results that when the registering wheel has made a complete revolution, the trip-pin will strike the operating nose 59 and thereby swing the rear end of the trip-pawl backward against the tension of the spring 55, thereby permitting the transfer pawl to swing toward the front under the impulse of its spring 61 until the shoulder 57 drops into the second or inner notch of the trip-pawl. This brings the upper operating end of the transfer-pawl into such position that at the subsequent operation of the crank handle, the transfer-pawl will turn the registering-wheel of next higher denomination one notch, as is usual in registering machines.

The stop-pin 62, one of which is carried by each transfer-pawl, is for the purpose of preventing said pawl from being inadvertently or otherwise moved entirely out of operative position; in other words, it limits the movement of said pawl. It is also for the purpose of locking said pawl in engagement with its ratchet-wheel 48 at the point of the extreme upward travel of said pawl to prevent overthrow.

By reference to Fig. 7 it will be seen that the cam projections 54 are inclined so that when the counter frame is in its normal position, shown in Fig. 2, the levers 51 have been depressed sufficiently at their forward ends to cause the transfer pawls to slightly overlap the teeth of the ratchet wheels. This is to prevent the transfer pawls falling in back of the ratchet teeth when the trip pawls 56 are operated by the counter being turned to zero.

The three registering-wheels on the left-hand end of the counter are not actuated directly by the registering-racks and receive movement only as it is transmitted to them from the tens-of-dollars registering-wheel. A single pawl-actuating lever 51, shown in Figs. 4 and 5, has pivoted to its rear end a triple-pawl 63 which has three graduated teeth arranged in a manner well known in the art whereby the hundreds-of-dollars registering wheel 64 is turned one notch whenever the tens-of-dollars wheel 65 has made a complete revolution. To this end I employ the usual trip-pawl 56 which coöperates with the tripping pin 60 carried by the tens-of-dollars registering wheel and with the shoulder 57ª on the triple-pawl 63. And in a manner that is now well known in the art, when the hundreds-of-dollars registering wheel has made a complete revolution, the thousands-of-dollars registering wheel 66 is turned one notch, etc.

In Fig. 2 are shown the various devices for giving the counter two motions; that is, first, its horizontal movement and second, its vertical reciprocation. Its horizontal movement, as previously stated, is for the purpose of bringing the registering-pinions 46 into alinement with the vertically-extending registering-racks. The vertical reciprocation of the counter is for the purpose of causing the registering pinions to pass downward in engagement with the then-stationary registering-rack teeth, whereby the several registering wheels are turned to a greater or less extent according to the position of the setting-levers. When it has reached the lowermost point of its vertical reciprocation, the counter is swung toward the front of the machine, which disengages it from the registering-rack teeth, and then while held disengaged it is again swung upward to normal position.

The lateral movement of the counter is effected through a horizontal pitman 67 (Fig. 2) which is pivoted to one of the side arms 32 of the rock-frame in which the counter is carried. The rear end of the link is bifurcated, forming two fingers 68, which straddle the rotation shaft 24. Secured to one side of the pitman near its bifurcated end, is an anti-friction roller 69 which slides within a cam-groove 70 (shown in broken lines in Fig. 2) in the disk 71 (Fig. 16) fast upon the revolution-shaft 24. The configuration of the cam-groove is such that as soon as the crank is started the counter frame is swung toward the rear into alinement with the registering-rack-teeth, as heretofore described. It is held in this position during perhaps half a turn of the handle and is then thrown out and toward the front and thus held until a subsequent operation of the machine.

The vertical reciprocation of the counter is brought about by the operating-lever 72, which is pivoted between its ends upon a horizontal shaft 73, which is supported in a suitable bracket 74 secured to the frame of the machine. At its rear end the operating-lever carries an anti-friction roller 75 which runs within the cam-slot 76 (shown in broken lines in Fig. 2) formed in the disk 77, which is rigidly secured upon the rotation-shaft 24. At its front end, the operating lever is slotted, forming two arms 78 which straddle the cross-shaft 79 of the counter-frame. By the means just described the counter is given a vertical reciprocation at each operation of the machine because the configuration of the cam-slot 76 is such as to swing the front end of the operating lever downward and back to normal position whenever the crank is turned, and this, of course causes the counter to slide downward in its ways 31 and then back to normal position.

It will be noticed that most of the parts of the machine which have a constant movement whenever the register is operated, are actuated by means of cam-grooves within disks which are fast upon the rotation-shaft 24. Such a disk, with its cam groove, is sometimes technically known as a "box-cam," and it may be hereinafter so designated.

In order to aline the setting levers so that they will always stop at a point so that the indicating numerals, the printing type, and the registering-rack teeth will always be left in proper alinement, and for the further purpose of locking the setting levers and the parts controlled thereby during the revolution of the crank, I provide the locking and alinement-pawls 80 (Fig. 2), of which there are four; that is, one for each setting-lever. These are bell-crank in form and are hinged about central upon the transverse-shaft 73. The forward end of each of said pawls is provided with a wedge-shaped, up-turned nose 81 which coöperates with a series of V-shaped alining teeth 82, which may be formed in the lower edge of the segment-plates 25; or, as in the present instance, may be formed in the edge of metal pieces 83, which are then secured respectively to the segment-plates. The down-turned rear ends of the locking-and-alining pawls 80 (Figs. 2 and 11) pass downward just behind the tie-bar 84, and just in front of the cross-bar of the locking frame 85, (Fig. 18). This frame is pivoted upon the cross-shaft 73 and has a series of four set-screws 86 in its cross-bar end for the purpose of adjusting the alining pawls 80, and a locking nose 87. Each set-screw bears against its respective alining and locking pawl 80 so that they may be adjusted so as to aline the various parts of the machine simultaneously by the operation of the crank. The locking-nose 87 coöperates with the locking-disk 88 which is rigidly secured upon the rotation-shaft. It has a locking-notch 89 normally in such a position that the locking-nose 87 is freely movable therein. As soon, however, as the crank is started, the rotation-shaft is moved far enough to present the solid periphery of the locking disk 88 in the path of the locking-nose 87, and thereby it is impossible to swing the alining nose 81 out of engagement with their alining teeth 82 until the crank has returned to normal position, and hence it is impossible to move any of the setting levers during the operation of the crank.

As may be seen in Fig. 4, the counter-shaft 45 is extended at its left-hand end through the counter-frame, and upon said shaft outside the counter-frame (as shown in Figs. 4 and 6) is secured the turn-to-zero disk 90. Coöperating therewith is the stop-pawl 91 which is pivoted to the outer side of one of the side-arms 32. It has a lateral lip 92 which extends over the rear edge of the side arms, and thereby the locking pawl can only swing a short distance in either direction. As will be readily seen by an inspection of Fig. 6, part of the said pawl extends and forms a finger 93, which coöperates with a stop-pin 94 carried by the turn-to-zero disk 90. Its spring 95 tends to keep the stop-pawl in its backward position, as shown in Fig. 6, in which the lip 92 is in contact with the rear edge of the side arms. And normally also the stop-pin 94 rests against the front edge of the stop-pawl. Therefore, when the turn-to-zero wrench is applied to the flattened end 96 of the counter-shaft, the latter can only be turned in one direction; that is, as shown by the arrow in Fig. 6; and when the stop-pin has made a complete revolution it strikes the stop-finger 93 and swings it forward until the lip 92 prevents further movement and the arrangement is such that by this time all of the registering wheels have been set to zero. When the machine is subsequently operated the counter moves down carrying the pin 94 below the stop-pawl 91 whereupon the spring 95 throws the stop-pawl to its other and normal position. The turn-to-zero disk 90 has a flat side 90$^a$ which moves adjacent the rib 90ᵇ along the right-hand edge of the side arm 32 (Fig. 6) whereby the counter-shaft can not be turned except when the counter is in normal position.

In order to prevent the crank-handle from being started or operated while the machine is being turned to zero, I arrange the machine so that the turn-to-zero wrench must be inserted through a suitable irregular aperture 97 formed in the side frame. But between this aperture and the flattened end of the counter-shaft intervenes the flat locking-lever 98, which is hung upon the pivot shaft 21ᵃ. See Fig. 6. The front end of this locking-lever must, therefore, be swung downward, (it cannot swing upward because of the stop pin 98ᵃ) before the wrench can be fitted to the end of the counter-shaft, and when this is done the square rear end of the lever is brought directly in front of the locking-pin 100, which in the present instance is carried by a full-stroke disk 101 which is carried upon the rotation-shaft 24. Therefore, said disk, and consequently the rotation-shaft, cannot be turned, and hence the crank cannot be started, until the locking lever is returned to normal position, and this cannot be done until the turn-to-zero wrench is removed from the counter-shaft. It results from this construction, as will be readily understood, that the machine cannot be operated while the counter is being turned to zero. The pawl 101ᵃ coöperates with the full-stroke disk 101.

In practical use, before the machine is operated, a sales-slip of the kind shown in Fig. 15 is filled out by the clerk making the sale. In the drawing the voucher is shown as severed from the main sales-slip, but normally it forms an integral part of it, though it is afterward severed by the machine, as will be presently described. Nor is the amount or date printed either upon the main sales-slip or upon the voucher until at the time the voucher is severed by the machine. Having filled out the entire sales-slip, usually with a pencil, the operator places it upon the inclined table 102 (shown in Figs. 1 and 3) and lets it slide down until its bottom edge rests against the stationary knife 119 at the lower end of the table. He then adjusts the setting-levers according to the indicators, or if he prefers, according to the scale which is upon the front of the case of the machine, as shown in Fig. 14. When he has properly set the levers, the indicators should show exactly the amount he wishes to register on the counter and print upon the sales-slip. The operator now turns the crank 22. By means to be hereafter described, the lower end of the table is raised so as to bring the voucher portion of the sales-slip against the type-wheels, whereby there is printed upon the voucher portion the amount and the date of the recorded transaction. At the same time the bottom edge of the slip will have been raised above the level of the top edge of the knife 119 and the feed-rollers 104 and 105 are then actuated to feed the sales-slip into the machine so far that the voucher portion of the same extends beyond the knife 119. The sales-slip is then again forced against the type-wheels, whereby the amount and the date of the recorded transaction are printed upon the main body of the sales-slip, and simultaneously a movable knife 106 is actuated which knife coöperates with the stationary knife 119 to sever the voucher portion from the slip and impale said voucher portion upon the pin-file 107. Thereupon the movement of the feed-rollers is reversed so that the main part of the sales-slip is fed out of the machine and to a position from which it may be readily removed by the operator. The table then swings back to normal position.

As heretofore described, the amount or value-printing-wheels 41, 41ᵃ, 41ᵇ, and 41ᶜ are directly connected with the setting-levers 21, and they are all mounted upon the printer-shaft 108 and just above the lower end of the table 102. In order to print upon the voucher and upon the main portion of the sales-slip the month and the day of the sale, I mount the date-printing wheels 109 on suitable sleeves 110 which turn on the printer-shaft 108. The date-printing-wheels are therefore concentric and in alinement with the amount or value printing-wheels. For convenience in setting the date-printing-wheels, I have secured upon the outer end of each of the sleeves a turn-button 111, (Fig. 10) to each of which is secured a ratchet-wheel 112 with which coöperates a spring-pressed pawl 113 which is pivoted to the main frame of the machine. The ratchet-wheel and its coöperating pawl enables one to more easily stop the turn button at the desired point, and it also enables one to have the date-printing wheels in proper alinement, for if the operator who is adjusting the date-printing wheels, stops when the pawls 113 fall into their notches, the date-printing wheels will then be in proper alinement.

The amount or value printing-wheels and the date printing-wheels are simultaneously inked by an ink-pad 113ᵃ carried by an inking-frame consisting of the arms 114 which at their front ends are hinged upon the short transverse shaft 115 which extends between and is rigidly held by short arms 116, which at their lower ends are rigidly secured upon the cross-shaft 117. A coiled spring 118 on the transverse shaft 115, tends normally to throw the ink-pad downward away from the printing-wheels.

The movable knife-blade 106, (Figs. 3 and 12) which coöperates with a stationary blade 119, extends across just under the inking frame. In fact the latter rests upon and is supported by the movable knife-blade which is secured to the rear ends of two arms 120 which are journaled upon the cross-shaft 117. Integral with the left-hand one of the arms 120 is the operating crank-arm 121, which in turn is pivoted to the front end of a pitman 122 (Fig. 12), the rear end of which is bifurcated and straddles the rotation-shaft 24. Carried by the pitman is an anti-friction roller 124 which works in the groove of a box-cam 123, which, like the other box-cams heretofore referred to, is rigidly secured upon the rotation-shaft. The configuration of the groove in the box-cam is such that the instant the crank 22 is started, the movable knife-blade is moved slightly upward far enough to cause the ink-pad to press against the printing types so as to deposit a coating of ink thereon. Then the knife-blade falls back to normal position, which permits the inking pad to drop away from the printing types. At this time the ink-pad is rapidly swung toward the front and out from under the type-wheels, and this is accomplished by rocking the transverse shaft 117 through a connection shown in detail in Fig. 13. This consists of the crank-arm 125, which, like the arms 116, is rigidly secured upon the right-hand end of the transverse shaft 117, shown in Fig. 1. Jointed at its front end to the crank-arm 125 is a bent pitman 126 (Fig. 13) which has a bifurcated rear end straddling the rotation shaft 24. It has the usual anti-friction roller 127 coöperating with the box-cam 128.

It will be noticed that the inking frame rests at all times upon the movable knife-blade 106, and so far as its movement up and down is concerned, it is entirely dependent upon the movement of said knife-blade. The operating parts shown in Fig. 13 control only the lateral movement of the inking frame. Thus when the operating crank is started the slight upward movement of the knife-blade forces the ink-pad against the printing type, as already stated; then the pad falls back to normal position. At this time the box-cam 128 forces the curved or bent link 126 to the rear, which results in rocking the shaft 117 and moving the ink-pad toward the front of the machine and out from under the type-wheels. As soon as the ink-pad is well out, the box-cam 123 raises the movable knife-blade 106, thereby raising the ink-pad against the tension of its spring 118. As the blade rises, the table 102 is also swung upward, bringing the sales-slip against the type to receive the printed impression. By this time the movable knife-blade and the ink-pad are raised so high that there is plenty of space between the movable blade and its fixed blade 119 to permit the sales-slip to be fed between them. The subsequent descent of the movable blade severs the voucher portion above the pointed upper end of the pin-file 107. The further descent of the knife-blade impales the voucher on the pin-file, as will be readily understood.

We come now to a description of the construction and operation of the table and the devices for feeding the voucher portion of the sales-slip under the knife after one printed impression has been made thereon. The table and its corresponding parts are best shown in Figs. 3 and 16, wherein it will be seen that near its upper end the table is journaled on a cross-shaft 130. The upper end of the table, therefore, is relatively stationary, but its lower end is arranged to be swung upward twice during each operation of the operating crank in order to twice force the sales-slips against the type-wheels, whereby the amount of the recorded transaction and the date are twice printed by the machine upon the sales-slip, as shown in Fig. 15. To this end an arm 131 extends rigidly downward from the table. At its lower end it is provided with an anti-friction roller which coöperates with a box-cam 132 having a cam groove 133 of the peculiar configuration shown in broken lines in Fig. 3, whereby the paper sales-slip is first forced against the printing type and the impression is made upon the voucher portion; then the table recedes slightly and the feed-rollers 104 and 105 are operated by a slide 134 to feed the paper down between the knife-blades, which shear off the voucher portion. The paper then again is raised by the table to make a second duplicate impression on the main portion of the sales-slip. Afterward the table is slightly dropped and the feed-rollers are turned backward by the reverse movement of the slide 134, which results in feeding the main portion of the sales-slip up the table, where it will be very readily accessible to the operator. To more properly distribute the force required to operate the machine, a spring 130ª may be employed. This is wound around the shaft 130 and has one end attached to the table and the other one fixed.

Near its lower end and in position to force the paper properly against the printing type, there is provided a small platen 135, which has one or more set-screws 136 for purposes of adjustment. The upper feed-roller 104 is journaled in the rear ends of pivoted arms 137, one of which is shown in Fig. 3. A coiled spring 138 connects these arms with the main frame, whereby said spring normally holds the upper roller in its lowermost position; that is, with the stop-finger 139 in contact with the stop-pin 140 which is secured to the frame of the machine.

The lower feed roller is provided at its right-hand end, and outside of the bracket 141 in which it is journaled, with a pinion 142 which is at all times in engagement with the rack of the slide 134. The latter is slotted at its upper end and a headed guide-pin 143, and also the end of the shaft 130, pass through the slot and form bearings by which the movement of the slide is guided. The slide is reciprocated by means of the bell-crank 144 which is pivoted to the main frame at 145. The upper end of the bell-crank is slotted to receive a headed pin 146. At its lower end the bell-crank carries the usual anti-friction roller 147, which coöperates with the cam-groove 148 of the box-cam 149.

In Fig. 3 the parts are shown in normal position and it will be evident by an inspection of the cam-groove 148 that the slide 134 is not moved until the crank 22 is turned perhaps one-third of a rotation. Then the bell-crank is swung upward, causing the slide 134 to move upward, and the rack of the slide to turn the pinion 142, and consequently the lower feed roller 105. Subsequently the further movement of the rotation-shaft and the cam 149 causes the bell-crank 144 to return the slide to the normal position shown.

It will be noticed that there is normally plenty of room between the feed rollers for the insertion of the sales-slip. But as the lower end of the table is swung upward, the two rollers come together and the upper one is lifted somewhat against the tension of its spring 138 before the paper strikes the printing type. This of course causes the paper sales-slip to be held between the spring contact of the feed rollers, and of course when the feed rollers are operated the sales-slip will be fed down between the knife-blades and out again, as already described.

The pin-file 107, upon which the voucher portions of the sales-slips are impaled, is mounted on and carried by a platform 150 which is hinged at its rear edge at 151 to a fixed portion of the frame. A coiled spring 152 connects the platform with the fixed portion of the frame and tends to hold the pin-file in normal position and to restore it to normal position if displaced therefrom. A spring-pressed latch 153 (Figs. 1 and 3) which is pivoted at its lower end at 154 to the main frame, is provided with a shoulder 155, which, by engagement under the platform is arranged to lock the latter, and consequently the pin-file 107 in the normal position shown in the drawings and the pin file 107 is arranged in a closed compartment having a locked door 156 which can only be opened by the auditor or other person having a pass key. When it is desired to remove the vouchers from the pin-file, it is only necessary to unlock the door 156 and disengage the latch 153 by pressing it to the left, whereupon the platform can be swung down, which swings the pin-file down to the front to such a position that the vouchers can be readily removed. Then when the vouchers are removed from the platform, the spring 152 automatically brings it back to position and the latch swings into place thereby locking the pin-file in position ready to receive the next voucher that may be cut off.

Of course the several features of my invention can be used separately instead of in conjunction as herein shown and described; as, for example, the counter, or the indicators, or both, could be omitted without interfering with the operation of the balance of the machine in any respect. And of course a different mode of filing the severed vouchers could be employed. Undoubtedly in actual practice the specific arrangement, as I have shown it, will often be departed from as the systems used by different department stores, for which my invention is designed, vary so considerably.

Having thus described my invention, I claim as new and desire to secure by Letters Patent:

1. In a machine of the class described, the combination with the table to receive the sales-slip, of the printing-wheels or type carrier, the knife, and means for causing the sales-slip to receive two sets of printed impressions from the same type and for causing the knife to sever the sales-slip at a point between said printed impressions.

2. In a machine of the class described, the combination with type carriers, and platen devices for printing therefrom on a record material, of feeding rollers, means for giving said platen devices and said feeding rollers each two printing and feeding movements at each operation of the machine, a knife positioned to engage the record material at a line between the two printed impressions, and means for operating said knife.

3. In a machine of the class described, the combination with the table, the type-carriers, and an inaccessible receptacle within the machine, the knife, of operating devices for causing two printed impressions to be made upon an inserted sales-slip, and means for actuating the knife to sever a portion from the sales-slip, whereby said portion remains in the inaccessible receptacle and the remainder of the sales-slip is entirely accessible from the exterior of the machine.

4. In a machine of the class described, the combination with the table, of a type-carrier, the knife, a feed-roller carried by the table, a second coöperating feed-roller which is relatively stationary, and means for actuating the table, the feed rollers, and the knife, so as to operate upon the sales-slip in the following manner: first, to make a printed impression, second, to move the slip into operative position with respect to the knife, third to move the knife so as to sever a portion of the slip and file it within the machine, and fourth to render the remaining portion of the sales-slip accessible to the operator from the exterior of the machine.

5. In a machine of the class described, which is adapted for use in connection with a sales-slip comprising a main portion and a voucher portion, the combination with the table or platen, of a type-carrier, a knife, feed-rollers, and an operating mechanism arranged to cause the type carrier to make a printed impression upon the voucher portion of the sales-slip, and to then actuate the feed-rollers so as to move the sales-slip into operative position with respect to the knife; to actuate said knife so as to sever the voucher portion and leave it within the machine, and to cause said type-carrier to make a second printed impression upon the main portion of the sales-slip, which is then left accessible to the operator from the exterior of the machine.

6. In a machine of the class described, the combination with the table or platen, of a type-carrier, and a knife which is located adjacent an inaccessible compartment within the machine, a feed-roller movable with the table or platen, a relatively stationary feed-roller coöperating therewith, a rack also movable with the platen and arranged to turn the movable feed roller, an operating device arranged to first cause a printed impression to be made upon an inserted sales-slip, and subsequently to reciprocate the slide so as to feed the sales-slip into an operative position with respect to the knife, to operate the knife so as to sever a portion of said sales-slip and to cause the sales-slip to receive a second printed impression from the type carrier.

7. In a machine of the class described, the combination with the table or platen, of a type-carrier, and a knife, of a feed-roller movable with the platen, a rack for operating said movable feed roller, a second feed roller coöperating with the movable feed roller, said second feed-roller being arranged to contact with its coöperating feed roller while the platen is in contact with the type-carrier and also while slightly separated therefrom, and means for reciprocating the rack which turns the feed-rollers.

8. In a machine of the class described, the combination with the table or platen, of the type-carrier, the knife, a feed-roller movable with the platen, a second feed-roller which is journaled in pivoted arms and is under spring pressure tending normally to move it in the direction of its coöperating feed-roller, a stop device for keeping said feed rollers normally separated, means for moving the platen and the feed-roller which is movable therewith, so as to bring the coöperating feed-rollers into contact while the platen is still separated from the type-carrier.

9. In a machine of the class described, the combination with the platen, of a type-carrier, a feed-roller movable with the platen, a rack movable with the platen and arranged to operate the feed-roller, a second feed-roller which is movable toward and from the first mentioned feed-roller, a spring tending to move the second feed-roller toward its coöperating feed-roller, and means for first moving the platen against the type carrier then actuating the feed rollers, and finally causing the platen to be moved a second time against the type carrier.

10. In a machine of the class described, the combination with the platen, and a type-carrier, of a feed-roller movable with the platen, a relatively stationary feed-roller coöperating therewith, a knife, and operating means arranged to first move the platen against the type carrier; second, to operate the feed rollers; third, to actuate the knife; and fourth, to impress the platen a second time against the type carrier.

11. In a machine of the class described, the combination with the table or platen, a type-carrier, a feed-roller carried by the platen, a rack arranged to actuate the feed roller, a rotation-shaft and cams on said shaft arranged to move the platen and reciprocate the rack, substantially as described.

12. In a machine of the class described, the combination with the platen, and a type-carrier, of a feed-roller journaled in bearings carried by the platen, a rack also carried by the platen and arranged to actuate the feed-roller, an arm extending from the platen, a cam coöperating with said arm so as to move the platen, and a second arm which is arranged to reciprocate the rack to turn the feed roller.

13. In a machine of the class described, the combination with the platen, and a type-carrier, of an ink-pad arranged to ink the type-carrier, a knife, and a knife-carrying frame upon which the ink pad normally rests, for the purpose described.

14. The combination in a machine of the class described with a pin file, a hinged platform on which said pin file is secured, and a latch holding the pin file in normal position, of a knife for cutting slips, means for feeding the slips to a position to be cut by said knife, and a knife carrying frame positioned and constructed to force the severed voucher slips on the pin file.

15. In a machine of the class described, the combination with the type carrier, of a slip supporting platen, feeding devices mounted on the platen for feeding the slip forward between impressions, a knife for severing one portion of the slip so that it will remain in the machine, means for operating the platen, and means for operating the feeding device.

16. In a machine of the class described, the combination with printing types, of a slip supporting platen, a feeding device mounted on the platen, and a feeding device mounted independently of the platen and only brought into connection with the platen feeding device when the platen is operated.

17. The combination with a type carrier, of a platen, a feeding device mounted on the platen, and a feeding device mounted independently of the platen and brought into connection with the platen feeding device when said platen is operated to make an impression.

18. The combination with printing types, of a movable member carrying an ink pad, and a knife for severing a printed slip constructed to operate said movable member.

19. The combination with a type carrier, of a slip supporting platen, feeding means carried by the platen and constructed to first feed a slip forward to be printed and then back again after being printed.

20. The combination with a type carrier, of a platen, a feed roller mounted on the platen, a rack mounted on the platen for operating the feed roller, and means for reciprocating the rack.

21. In a machine of the class described, the combination with a type carrier, of a slip supporting platen, a knife, and means for feeding the slip forward to have a voucher cut therefrom and then back again to be removed from the machine.

22. In a machine of the class described, the combination with a register, a type carrier, means for setting the register for operation and actuating the type carrier, a slip supporting platen, a knife for cutting a voucher from the slip and filing it in the machine, and a common means for operating the register, the platen and the knife.

23. In a machine of the character described, the combination of means for printing the slip, means for advancing the latter a predetermined distance after being printed, and means for severing the printed part, means for repeating the printing impression on the remaining part, and means for retracting said remaining part, substantially as described.

24. In a machine of the character described, the combination with an operating mechanism, of a printing device, a feeding roller carrying a pinion, a rack bar engaging said pinion, a bell crank lever connected to one end of said rack bar, and a cam connected to the operating mechanism and engaging said bell crank lever.

25. In a machine of character described, the combination with an operating mechanism, of printing devices, a movable slip support, a feeding roller carried by said support and provided with a pinion, a rack bar engaging said pinion, a bell crank lever connected to one end of said rack bar, and a cam for operating the bell crank lever connected to the operating mechanism.

26. In a machine of the character described, the combination with type carriers, of a printing support for slips, means for taking successive impressions on the slip from the same type at one operation of the machine, means for feeding the slip between successive impressions, means for severing the slip between the two impressions with provisions existing by virtue of which one portion of the slip is retained within the machine while the other portion is permitted to be withdrawn.

27. In a machine of the character described, the combination with a printing mechanism including a slip-supporting member, of slip feeding rollers for first feeding the slip into position to be printed and then retracting the same after printing.

28. In a cash register, the combination with printing devices, of a movable platen for taking impressions therefrom, a friction roller carried by said platen, an additional roller engaged by said friction roller when the platen is operated, and means for rotating said rollers to feed a slip.

29. In a cash register, the combination with printing devices, of a pivoted platen for taking impressions from same, means mounted on said platen for feeding a slip, and means for rocking said platen to print both before and after the operation of said feeding means.

30. In a cash register, the combination with printing wheels, of a movable platen for taking impressions from same, means carried by said platen for feeding a slip, and means for moving said platen to print both before and after the operation of said feeding means.

31. In a machine of the class described, the combination with means for recording a transaction in duplicate upon a sales slip, of means for severing said slip between the records, and devices for feeding the slip to the severing means.

32. In a machine of the class described, the combination with means for recording a transaction in duplicate upon a sales slip, of means, independent of the recording means, for severing said slip between the records, and devices for feeding the slip to the severing means.

33. In a machine of the class described, the combination with means, including a single set of type carriers, for recording a transaction in duplicate, of means for feeding a slip between the recording of the duplicate records thereon, and means for severing the slip between the records.

34. In a machine of the class described, the combination with means, including a single set of type carriers, for recording a transaction in duplicate, of means carried by the recording means for feeding a slip between the recording of the duplicate records thereon, and means, independent of the recording means, for severing the slip between the records.

35. In a machine of the class described, the combination with means for recording a transaction in duplicate upon a sales slip, of means for severing said slip between the records, a storage receptacle and rollers for feeding the slip to deposit a portion thereof in the storage receptacle.

36. In a machine of the class described, the combination with means for recording a transaction in duplicate upon a sales slip, of means, independent of the recording means, for severing said slip between the records, a storage receptacle, and means for feeding the slip to have a portion thereof severed and deposited in the storage receptacle.

37. In a machine of the class described, the combination with means, including a single set of type carriers, for recording a transaction in duplicate upon a sales slip, of means for severing said slip between the records, a storage receptacle, and means for feeding the slip to have a portion thereof severed and deposited in the storage receptacle.

38. In a machine of the class described, the combination with means, including a single set of type carriers, for recording a transaction in duplicate upon a sales slip, of means for feeding the slip between the recording of the duplicate records, means for severing the slip between the records, and a storage receptacle in which a portion of the severed slip is deposited.

In testimony whereof I affix my signature, in the presence of two witnesses.

THOMAS CARROLL.

Witnesses:
  WM. H. MUZZY,
  IRA BERKSTRESSER.